US011643043B1

(12) United States Patent
Deng et al.

(10) Patent No.: US 11,643,043 B1
(45) Date of Patent: May 9, 2023

(54) VEHICLE SEAT WITH INFLATABLE BLANKET

(71) Applicant: Ford Global Technologies, LLC, Dearborn, MI (US)

(72) Inventors: Zhibing Deng, Northville, MI (US); Deepak Patel, Canton, MI (US); Joseph E. Abramczyk, Farmington Hills, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 17/674,878

(22) Filed: Feb. 18, 2022

(51) Int. Cl.
*B60R 21/02* (2006.01)
*B60R 21/231* (2011.01)
*B60R 21/01* (2006.01)
*B60R 21/207* (2006.01)
*B60R 21/00* (2006.01)

(52) U.S. Cl.
CPC ........... *B60R 21/231* (2013.01); *B60R 21/01* (2013.01); *B60R 21/02* (2013.01); *B60R 21/207* (2013.01); *B60R 2021/0034* (2013.01); *B60R 2021/01252* (2013.01); *B60R 2021/01286* (2013.01); *B60R 2021/0293* (2013.01); *B60R 2021/23153* (2013.01)

(58) Field of Classification Search
CPC ....... B60R 21/231; B60R 21/06; B60R 21/08; B60R 21/02; B60R 21/207; B60R 21/00; B60R 2021/01252; B60R 2021/01286; B60R 2021/0034; B60R 2021/0004; B60R 2021/0293; B60R 2021/23153; B60R 22/14; B60R 22/00; B60R 22/18; B60R 22/26; B60R 2022/028; B60R 2022/266; B60P 3/38; B62D 33/0612
USPC ... 280/728.1, 728.2, 730.1, 743.1, 748, 749, 280/751; 296/190.02; 297/464, 487, 488
See application file for complete search history.

(56) References Cited

U.S. PATENT DOCUMENTS

| 10,717,450 | B2 * | 7/2020 | Sirous ..................... B61D 1/02 |
| 11,040,689 | B2 | 6/2021 | Lin et al. |
| 11,225,216 | B1 * | 1/2022 | Lin ....................... B60R 21/207 |
| 2015/0217673 | A1 | 8/2015 | Langhoff |
| 2020/0031308 | A1 | 1/2020 | Svanberg et al. |

FOREIGN PATENT DOCUMENTS

| CN | 201380818 Y | * | 1/2010 |
| DE | 102014213301 A1 | | 1/2016 |
| DE | 102018206090 A1 | * | 10/2019 |
| DE | 102018206091 A1 | * | 10/2019 |
| DE | 102018206091 A1 | | 10/2019 |
| DE | 102018206093 A1 | * | 10/2019 |
| DE | 102018121057 A1 | | 3/2020 |

(Continued)

*Primary Examiner* — Keith J Frisby
(74) *Attorney, Agent, or Firm* — Frank A. MacKenzie; Bejin Bieneman PLC (57) ABSTRACT

An assembly includes a seat. The assembly includes an anchor fixed relative to the seat. The assembly includes a blanket engageable with the anchor and inflatable to an inflated position. The assembly includes a computer having a processor and a memory storing instructions to inflate the blanket in response to detecting engagement of the blanket with the anchor and to deflate the blanket in response to detecting disengagement of the blanket from the anchor.

20 Claims, 7 Drawing Sheets

(56) References Cited

FOREIGN PATENT DOCUMENTS

DE    102019201310 A1 *  8/2020
DE    102019118840 A1 *  1/2021  ............... B60N 2/01
FR        2859432 B1    12/2006

* cited by examiner

VEHICLE SEAT WITH INFLATABLE BLANKET

BACKGROUND

A vehicle body typically defines a passenger compartment to house occupants, if any, of the vehicle. The passenger compartment may extend across the vehicle, i.e., from one side to the other side of the vehicle. The passenger compartment typically includes a front end and a rear end with the front end being in front of the rear end during forward movement of the vehicle.

The vehicle typically includes a plurality of seats in the passenger cabin. The seats may be arranged in the passenger compartment in any suitable position, i.e., as front seats, rear seats, second-row seats, third-row seats, etc. The seats may be movable to various positions, e.g., movable fore-and-aft and/or cross-vehicle. The seats may be of any suitable type, e.g., a bucket seat, a bench seat, etc. While all modern OEMs of passenger vehicles currently warn occupants against not sitting upright in their seat in a vehicle while the vehicle is moving due to safety concerns, it is anticipated that technology and the regulatory framework may evolve in the future to where such an activity is safe and permissible.

BRIEF DESCRIPTION OF THE DRAWINGS

FIG. 1 shows one such example.

DETAILED DESCRIPTION

An assembly includes a seat. The assembly includes an anchor fixed relative to the seat. The assembly includes a blanket engageable with the anchor and inflatable to an inflated position. The assembly includes a computer having a processor and a memory storing instructions to inflate the blanket in response to detecting engagement of the blanket with the anchor and to deflate the blanket in response to detecting disengagement of the blanket from the anchor.

The instructions may include instructions to control inflation of the blanket based on a pressure of the blanket.

The blanket may define an inflation chamber, and the assembly may include a pressure sensor in fluid communication with the inflation chamber and in electronic communication with the computer.

The instructions may include instructions to command a blower to operate in a first direction to inflate the blanket.

The instructions may include instructions to command the blower to operate in a second direction opposite the first direction to deflate the blanket.

The instructions may include instructions to command the blower to an off state to deflate the blanket.

The blanket may be movable from a retracted position under the seat to a deployed position extending over the seat.

The blanket in the retracted position may be elongated along a seat-lateral axis.

The seat may include a seatback and a seat bottom extending from a proximate end at the seatback to a distal end spaced from the seatback, the blanket in the retracted position at the distal end.

The anchor may be at the proximate end.

The anchor may be configured to comply with ISOFIX.

The assembly may include a spool and a retractor operatively coupled to the spool, the blanket in the retracted position may be wound around the spool.

The instructions may include instructions to actuate the retractor to move the blanket to the retracted position in response to detecting disengagement of the blanket from the anchor.

The blanket in the inflated position may include a first bolster, a second bolster spaced from the first bolster, and a center portion extending from the first bolster to the second bolster.

The first bolster and the second bolster may be elongated along a seat-lateral axis.

The first bolster and the second bolster may be elongated along an axis, and the first bolster and the second bolster may extend beyond the center portion along the axis in a first direction.

The first bolster and the second bolster may extend beyond the center portion along the axis in a second direction opposite the first direction.

The first bolster may be spaced from the second bolster along a seat-longitudinal axis.

The blanket may define an access port at the anchor.

The access port may be defined by a recessed portion inward of an outer edge of the blanket.

With reference to the Figures, wherein like numerals indicate like parts throughout the several views, an assembly 20 for controlling kinematics of an occupant of a vehicle 22 includes a seat 24. The assembly 20 includes an anchor 26 fixed relative to the seat 24. The assembly 20 includes a blanket 28 that is releasably engageable with the anchor 26 and inflatable to an inflated position. The assembly 20 includes a computer 30 having a processor and a memory storing instructions to inflate the blanket 28 in response to detecting engagement of the blanket 28 with the anchor 26 and to deflate the blanket 28 in response to detecting disengagement of the blanket 28 from the anchor 26.

The vehicle 22 may be any suitable type of ground vehicle, e.g., a passenger or commercial automobile such as a sedan, a coupe, a truck, a sport utility, a crossover, a van, a minivan, a taxi, a bus, etc.

The vehicle 22 includes a frame and a body 32. The frame may be of a unibody construction in which the frame is unitary with the body 32 including frame rails, pillars, roof rails, etc. As another example, the body 32 and frame may have a body-on-frame construction also referred to as a cab-on-frame construction in which the body 32 and frame are separate components, i.e., are modular, and the body 32 is supported on and affixed to the frame. Alternatively, the frame and body 32 may have any suitable construction. The frame and body 32 may be of any suitable material, for example, steel, aluminum, and/or fiber-reinforced plastic, etc.

The body 32 defines a passenger compartment 34 to house occupants, if any, of the vehicle 22. The passenger compartment 34 may extend across the vehicle 22, i.e., from one side to the other side of the vehicle 22. The passenger compartment 34 includes a front end and a rear end with the front end being in front of the rear end during forward movement of the vehicle 22.

The vehicle 22 may include any suitable number of seats 24. The seats 24 may be arranged in the passenger compartment 34 in any suitable position, i.e., as front seats, rear seats, second-row seats, third-row seats, etc. The seats 24 may be movable relative to the floor to various positions, e.g., movable fore-and-aft and/or cross-vehicle. The seats 24 may be of any suitable type, e.g., a bucket seat, a bench seat, etc.

Each seat 24 may include a seatback 36 and a seat bottom 38. The seat bottom 38 may extend from a proximate end 42 at the seatback 36 to a distal end 44 spaced from the seatback 36. The seatback 36 may be supported by the seat bottom 38 and may be stationary or movable relative to the seat bottom 38. The seatback 36 and the seat bottom 38 may be adjustable in multiple degrees of freedom. Specifically, the seatback 36 and the seat bottom 38 may themselves be adjustable, in other words, adjustable components within the seatback 36 and/or the seat bottom 38, and/or may be adjustable relative to each other. The seatback 36 may include a seatback frame and a covering supported on the seatback frame. The seat bottom 38 may include a seat bottom frame and a covering supported on the seat bottom frame. The seatback frame and the seat bottom frame may include tubes, beams, etc. Specifically, the seatback frame may include a pair of upright frame members and the seat bottom 38 may include a seat pan. The seatback frame and the seat bottom frame, including the upright frame members and the seat pan, may be of any suitable plastic material, e.g., carbon fiber reinforced plastic CFRP, glass fiber-reinforced semi-finished thermoplastic composite organosheet, etc. As another example, some or all components of the seatback frame and the seat bottom frame may be formed of a suitable metal, e.g., steel, aluminum, etc. The covering may include upholstery and padding. The upholstery may be cloth, leather, faux leather, or any other suitable material. The upholstery may be stitched in panels 58a, 58b and 58c around the frame. The padding may be between the covering and the seatback frame and may be foam or any other suitable material.

Each seat 24 defines one or more occupant seating areas 40. The occupant seating area 40 is the area occupied by an occupant when seated on the seat bottom 38. For example, a bucket seat may define one occupant seating area and a bench seat may define two or more occupant seating areas 40, e.g., depending on a width of the respective seat 24. The occupant seating area is in a seat-forward direction D1 of the seatback 36 and above the seat bottom 38. Each seat 24 defines the respective seat-forward direction D1. The seat-forward direction D1 is a facing direction of an occupant of such seat 24 under normal operating conditions, e.g., extending from a proximate end 42 of the seat bottom 38 at the seatback 36 toward a distal end 44 of the seat bottom 38 spaced from the seatback 36. The occupant may occupy multiple seating areas seating, e.g., when laying across the seat bottom 38 of the seat 24. While all modern OEMs of passenger vehicles currently warn occupants against not sitting upright in their seat in a vehicle while the vehicle is moving due to safety concerns, it is anticipated that technology and the regulatory framework may evolve in the future to where such an activity is safe and permissible and one such example is shown in the example shown in the Figures.

The vehicle 22 may include one of more anchors 26. The anchor 26 releasability releasably secures the blanket 28, e.g., in a deployed position. The anchor 26 is fixed relative to the seat 24, e.g., via a fastener, weld, etc. The anchor 26 may be fixed to the frame of seatback 36 and/or the seat bottom 38, the body 32 and/or frame of the vehicle 22, etc. The anchor 26 may be at the proximate end 42 of the seat bottom 38. The anchor 26 may be configured to comply with ISOFIX (ISO 13216), the international standard for attachment points for child safety seats in passenger cars. ISOFIX may be referred to as LATCH ("Lower Anchors and Tethers for Children") in the United States, LUAS ("Lower Universal Anchorage System") or Canfix in Canada, and/or UCSSS ("Universal Child Safety Seat System"). For example, a pair of the anchors 26 may have a center-to-center distance of 280 millimeters. As another example, the anchor 26 may have a width of at least 25 millimeters. As one more example, the anchor 26 may have a diameter of 6 millimeters, with a tolerance of +/−0.1 millimeters. In addition to dimensional requirements, the anchor 26 may be designed to have a certain strength, e.g., to meet the ISOFIX standard.

The blanket 28 includes or more panels 58a, 58b, 58c of woven and/or non-woven fabric. For example, the blanket 28 may be woven nylon yarn, for example, nylon 6, 6. Other examples include polyether ether ketone (PEEK), polyetherketoneketone (PEKK), polyester, etc. The woven polymer may include a coating, such as silicone, neoprene, urethane, etc. For example, the coating may be polyorgano siloxane.

Figure 1:
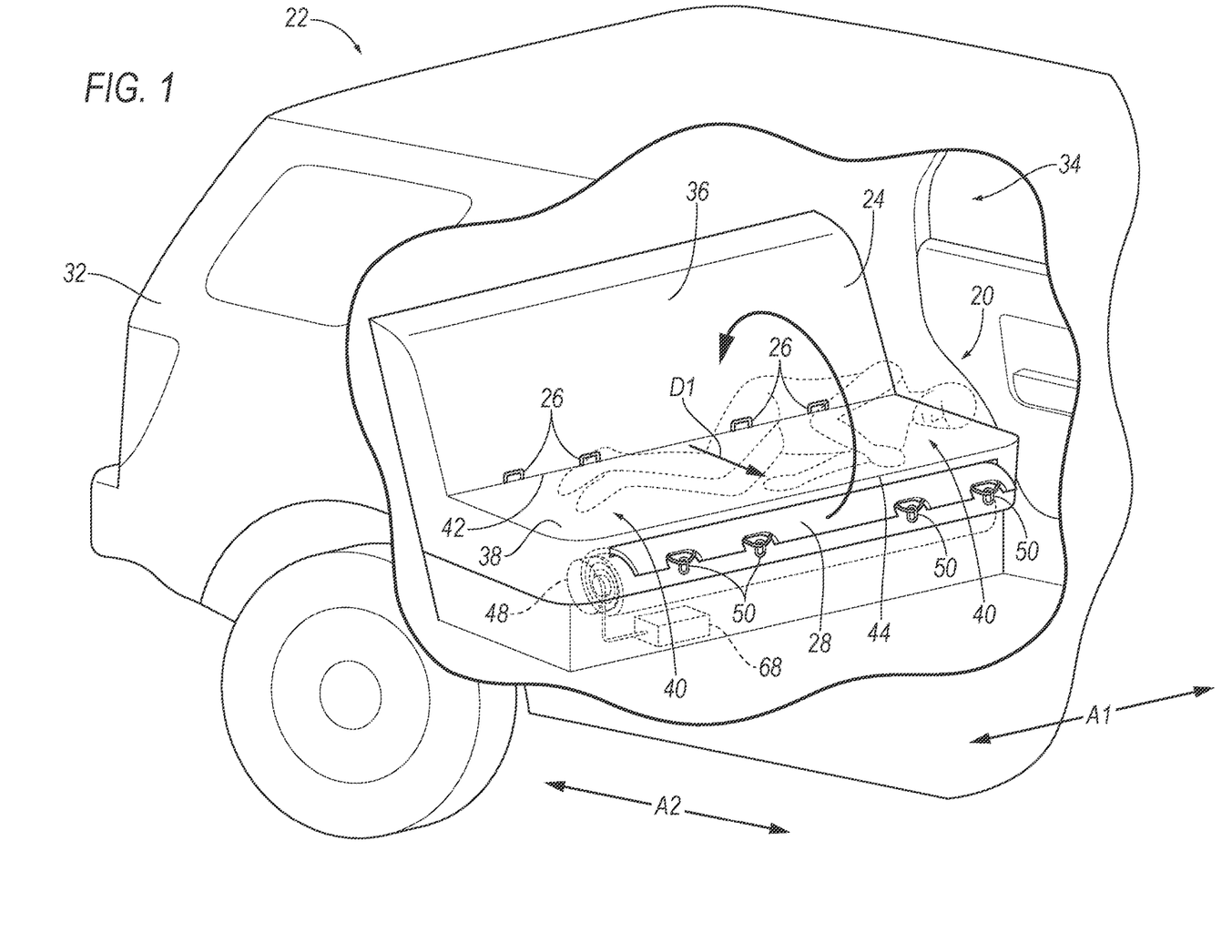
FIG. 1 is a perspective view of an example vehicle with a seat and an inflatable blanket in a retracted position. While all modern OEMs of passenger vehicles currently warn occupants against not sitting upright in their seat in a vehicle while the vehicle is moving due to safety concerns, it is anticipated that technology and the regulatory framework may evolve in the future to where such an activity is safe and permissible
Figure 2:
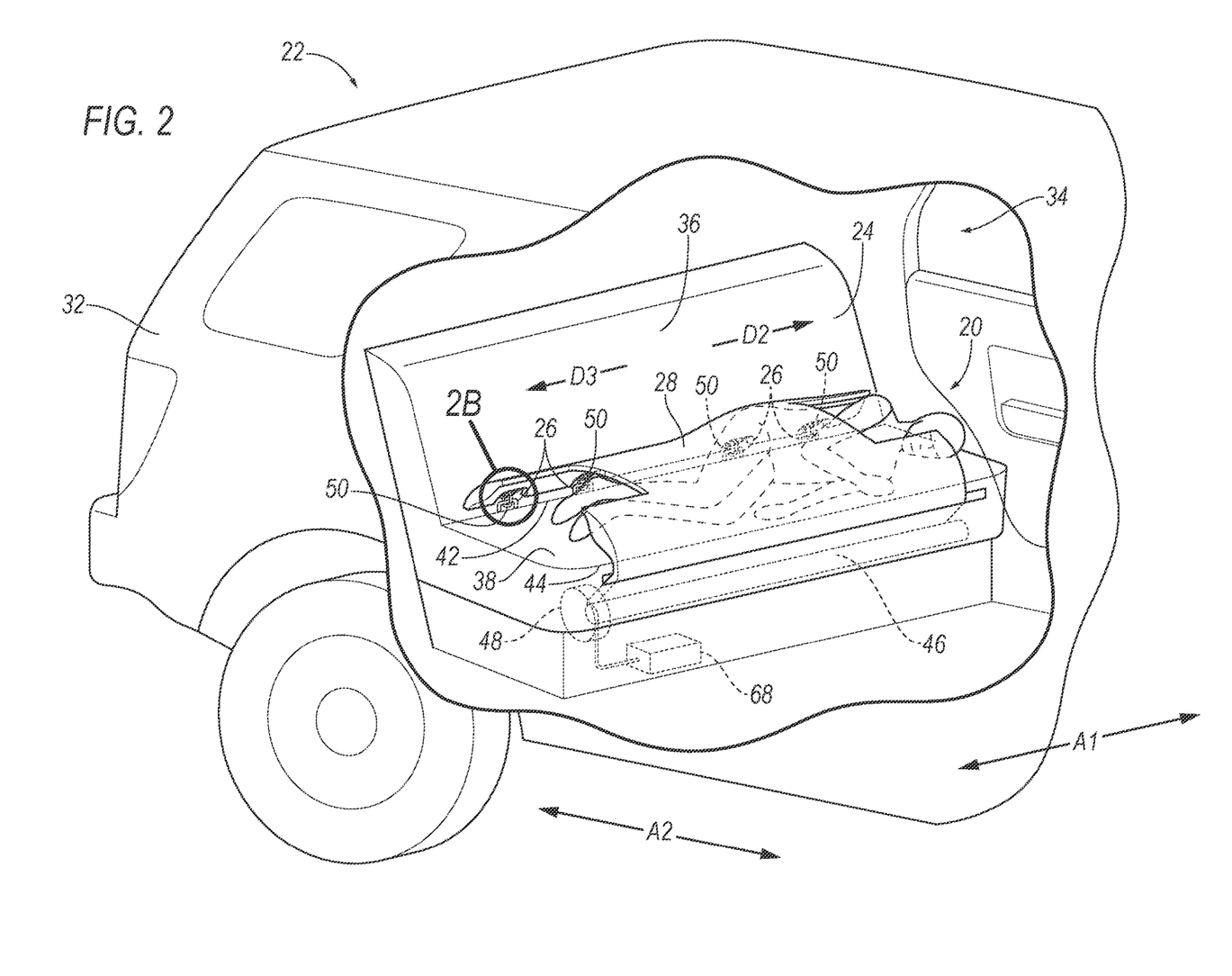
FIG. 2 is a perspective view of the example vehicle with the seat and the inflatable blanket in a deployed position.
Figure 3:
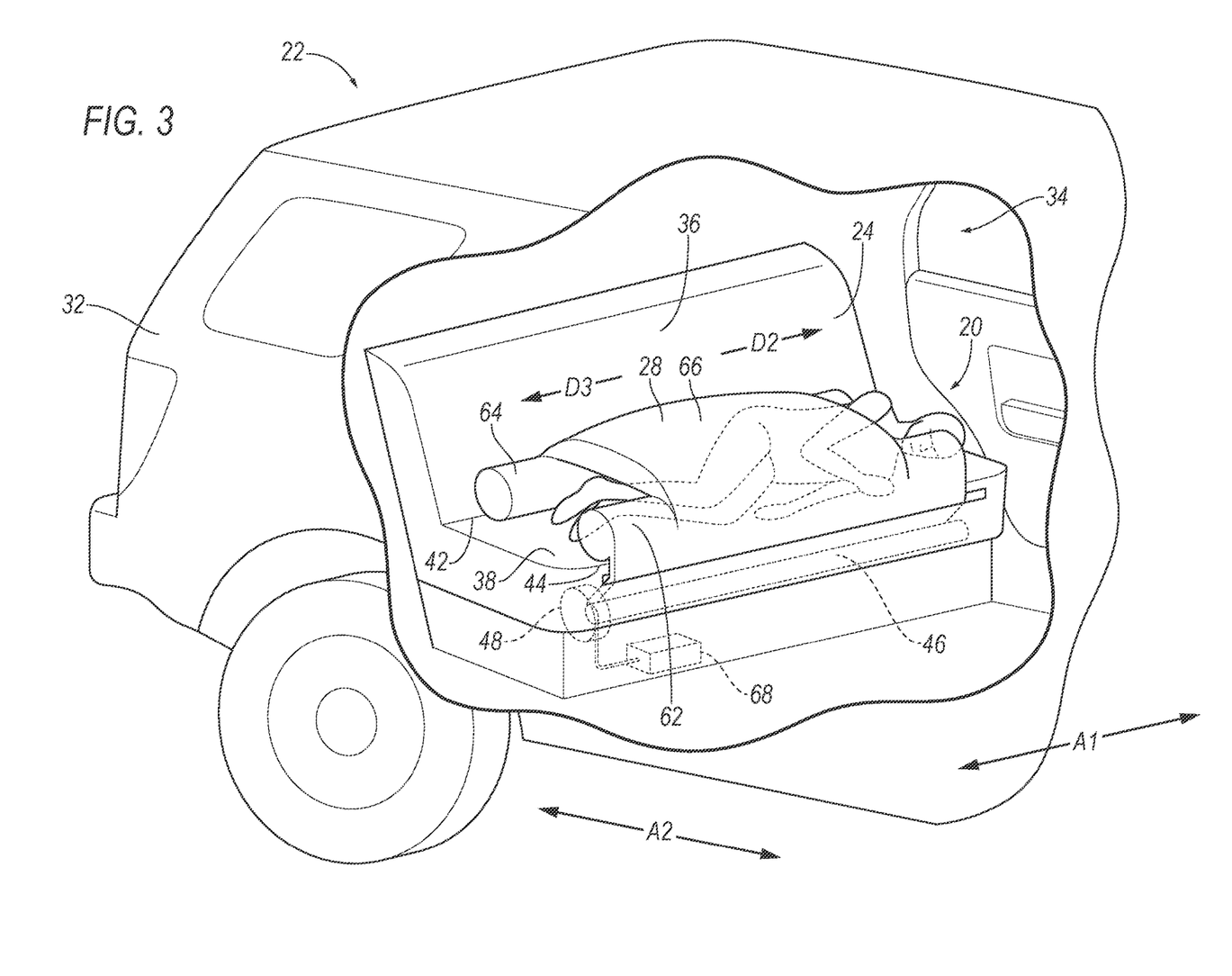
FIG. 3 is a perspective view of the inflatable blanket inflated to an inflated position and in the deployed position.
Figure 4:
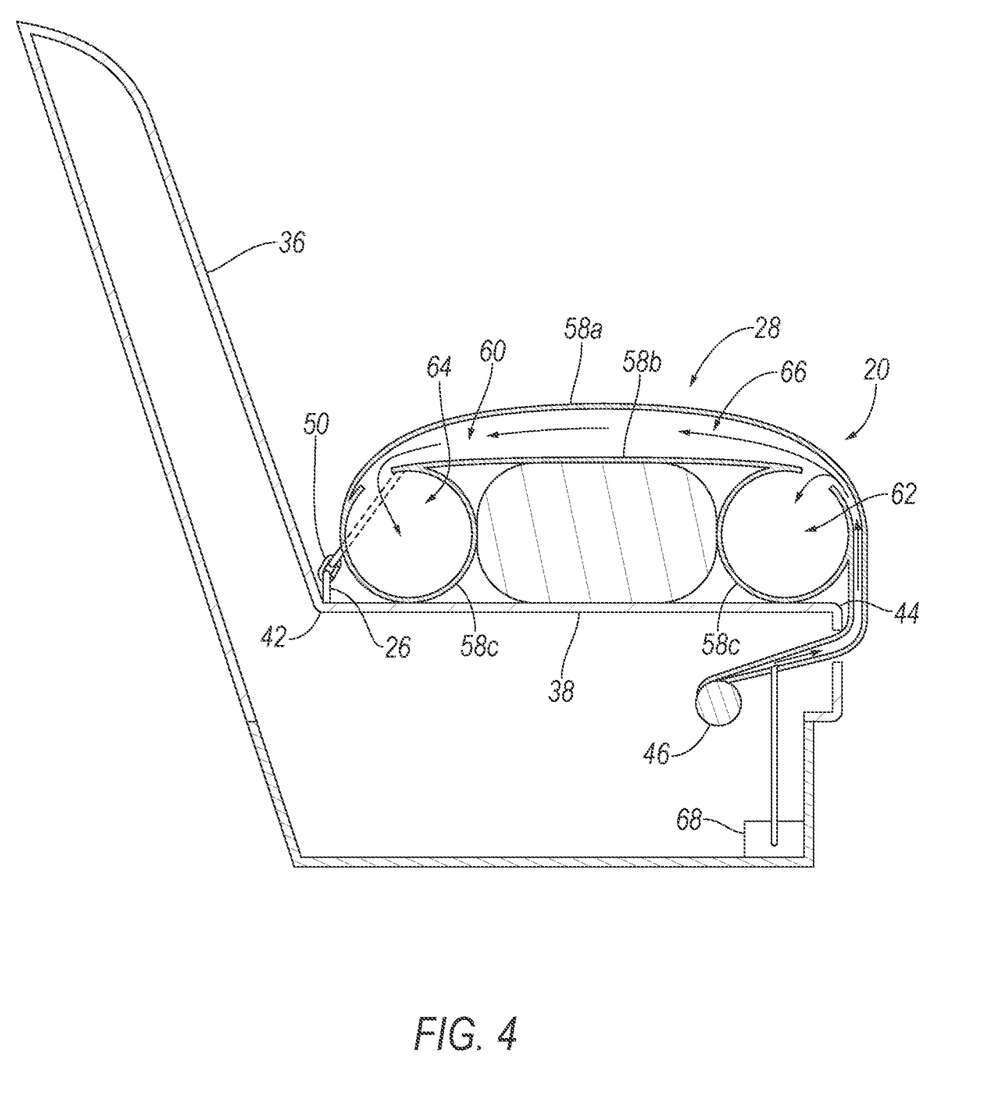
FIG. 4 is a cross-section of the inflatable blanket inflated to the inflated position.

The blanket 28 is movable from a retracted position, shown in FIG. 1, to the deployed position, shown in FIGS. 2-4. The blanket 28 in the retracted position may be under the seat 24, e.g., at the distal end 44. The blanket 28 in the retracted position may be elongated along a seat-lateral axis A1. The seat-lateral axis A1 is perpendicular to the seat-forward direction D1. For example, a spool 46 may be supported under the seat bottom 38, the spool 46 elongated along the seat-lateral axis A1. The blanket 28 may be connected to the spool 46, and, in the retracted position, the blanket 28 may be wound around the spool 46. A retractor 48 may be operatively coupled to the spool 46 to apply torque to the spool 46 and bias the blanket 28 toward the retracted position. The retractor 48 may include a spring, e.g., a torsion spring. Moving the blanket 28 to the deployed position may rotate the spool 46 and increase tension in the spring. The retractor 48 may include a motor or other suitable structure for generating torque. Actuation of the motor may rotate the spool 46, e.g., to move the blanket 28 to the retracted position. The retractor 48 may include a locking mechanism that inhibits rotation of the spool 46, e.g., during an impact to the vehicle 22. The locking mechanism may include, for example, a ratchet gear and weight inertia pawl, or any other suitable structure of selectively inhibiting rotation of the spool 46.

The blanket 28 in the deployed position may control kinematics of an occupant of the seat 24, e.g., laying across the seat bottom 38. The blanket 28 in the deployed position extends over the seat 24, e.g., over the seat bottom 38 from the distal end 44 to the proximate end 42. The occupant may be between the seat bottom 38 and the blanket 28.

The blanket 28 is releasably engageable with the anchor 26, e.g., to selectively inhibit movement of blanket 28 from the deployed position to the retracted position. For example, the blanket 28 may include a clip 50 fixed relative to the fabric of the blanket 28. The clip 50 may include a hook that can be disposed around the anchor 26 and a latch movable between an open position permitting the hook to be removed from the anchor 26 and a closed position inhibiting removal of the hook from the anchor 26. The blanket 28 may include any other suitable structure engageable with the anchor 26.

Figure 2B:
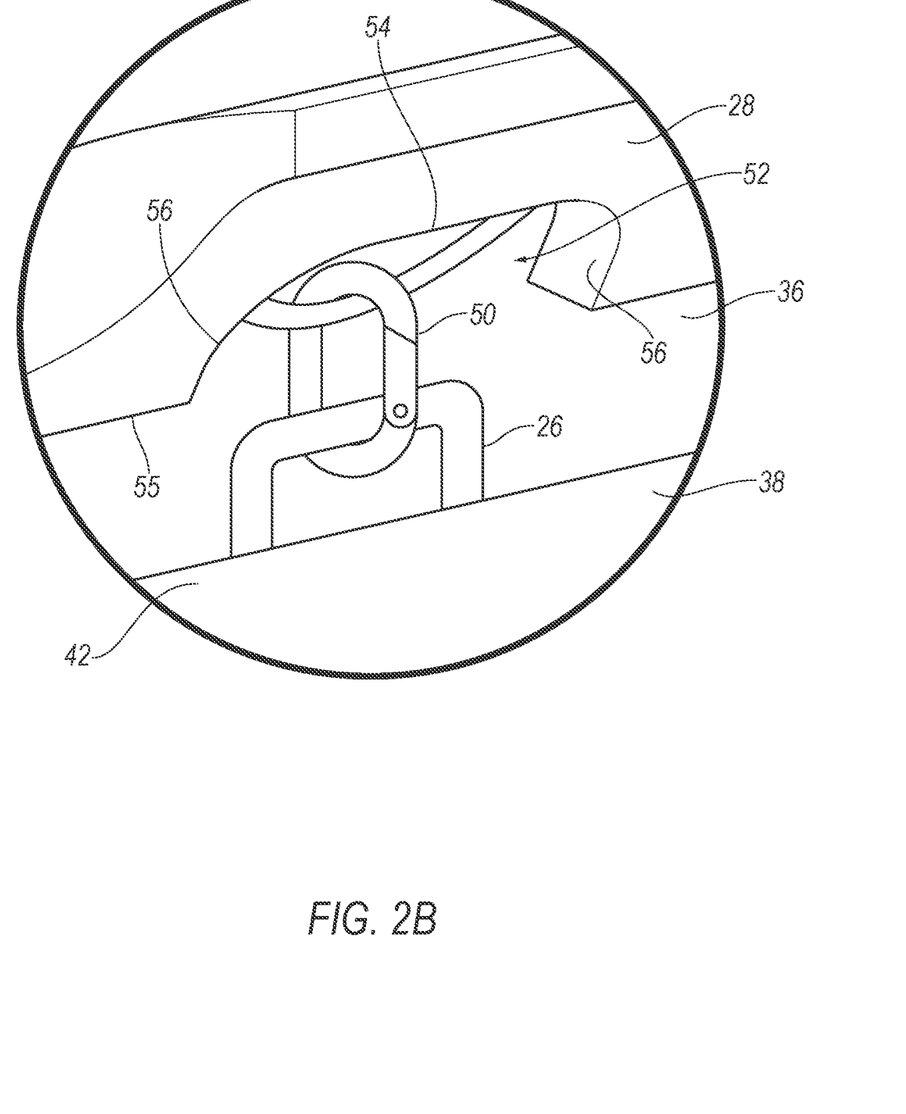
FIG. 2B is an enlargement of a portion 2B of FIG. 2.

The blanket 28 may define an access port 52, shown in FIG. 2B. The access port 52 may enable engagement and/or disengagement of the blanket 28 with the anchor 26. The access port 52 of the blanket 28 may be at the anchor 26, e.g., in the deployed position. The access port 52 may be defined by a recessed portion 54 of the fabric of the blanket 28, the recessed portion 54 inward of an outer edge 55 of the blanket 28. The recessed portion 54 may include opposing side ends 56. The anchor 26 and/or the clip 50 may be between the opposing side ends 56.

The blanket 28 is inflatable from an uninflated position, shown in FIG. 2, to the inflated position, shown in FIGS. 3 and 4. For example, and with reference to FIG. 4, the blanket 28 may include one or more panels, e.g., a top panel 58*a*, a bottom panel 58*b*, side panels 58*c*, etc., that define and enclose an inflation chamber 60. The inflation chamber 60 may be filled with gas, e.g., air, to move the blanket 28 to the inflated position. The gas may be removed from the inflation chamber 60 to move the blanket 28 to the uninflated position.

With reference to FIGS. 3 and 4, the blanket 28 in the inflated position may include a first bolster 62 and a second bolster 64. The first bolster 62 and the second bolster 64 may enclose portions of the inflation chamber 60, e.g., within the side panels 58*c*. The first bolster 62 and the second bolster 64 may be cylindrical, or any suitable shape. The first bolster 62 and the second bolster 64 may control kinematics of the occupant along a seat-longitudinal axis A2. The seat-longitudinal axis A2 may be parallel to the seat-forward direction D1. The first bolster 62 may be spaced from the second bolster 64. The first bolster 62 may be spaced from the second bolster 64 along the seat-longitudinal axis A2. For example, the first bolster 62 may be at the proximate end 42 of the seat bottom 38 and the second bolster 64 may be at the distal end 44 of the seat bottom 38. The first bolster 62 and the second bolster 64 may be elongated along the seat-lateral axis A1, e.g., across an entire width of the seat bottom 38.

The blanket 28 in the inflated position may include a center portion 66. The center portion 66 encloses part of the inflation chamber 60, e.g., between the top panel 58*a* and the bottom panel 58*b*. The center portion 66 may extend from the first bolster 62 to the second bolster 64. For example, the top panel 58*a* and the bottom panel 58*b* may each extend from the side panel on one side to the side panel on an opposite side. The first bolster 62 and second bolster 64 may be longer than the center portion 66. The first bolster 62 and the second bolster 64 extend beyond the center portion 66 along the seat-lateral axis A1 in a first direction D2 and/or in a second direction D3 opposite the first direction D2. For example, the first bolster 62 and the second bolster 64 may extend along a head and torso of the occupant of the seat 24, and the center portion 66 may cover the torso and not the head.

The assembly 20 may include a blower 68 operatively coupled to blanket 28 to inflate the blanket 28 to the inflated position. For example, air from the blower 68 may be provided to the inflation chamber 60 via tubing or any other suitable structure. The blower 68 may be any suitable type, e.g., a fan, or suitable type of compressor, e.g., a positive-displacement compressor such as a reciprocating, ionic liquid piston, rotary screw, rotary vane, rolling piston, scroll, or diaphragm compressor; a dynamic compressor such as an air bubble, centrifugal, diagonal, mixed-flow, or axial-flow compressor; or any other suitable type. The blower 68 may provide air to, and remove air from, the inflation chamber 60 of the blanket 28. For example, a motor of the blower 68 may spin in one direction to provide air to the inflation chamber 60, and the motor of the blower 68 may spin in an opposition direction to remove air from the inflation chamber 60. The blower 68 in an on-state may provide or remove air and in an off state does not provide or remove air.

Figure 5:
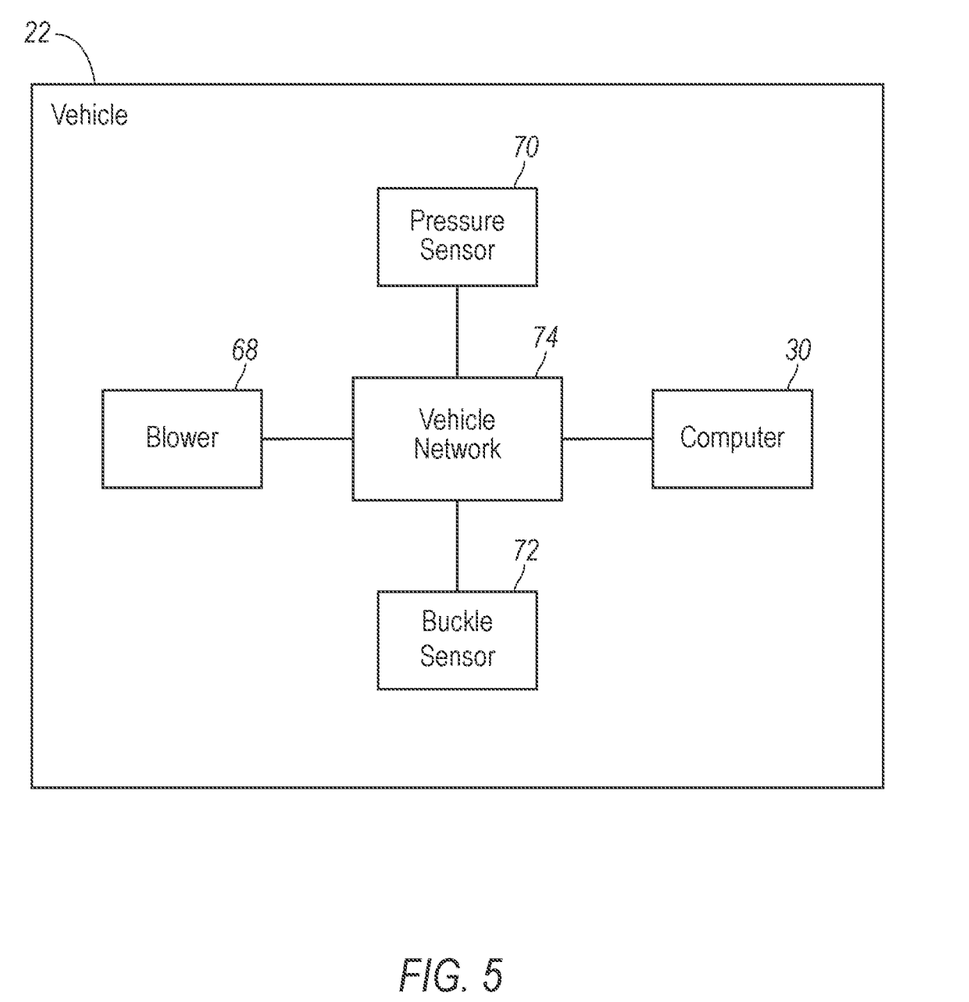
FIG. 5 is a block diagram of components of the vehicle.

With reference to FIG. 5, the assembly 20 may include a pressure sensor 70 in fluid communication with the inflation chamber 60 to detect pressure of gas in the inflation chamber 60. For example, the pressure sensor 70 may be configured to detect pressure in the inflation chamber 60 via tubing or the like connecting the pressure sensor 70 to the inflation chamber 60. As another example, the pressure sensor 70 may be configured to detect pressure in the tubing connecting the blower 68 to the inflation chamber 60. The pressure sensor 70 may be, for example, a piezoresistive pressure sensor, or any suitable type. The pressure sensor 70 may include a strain gage, a diaphragm and pressure cavity, or any other suitable structure.

The assembly 20 may include a buckle sensor 72 that detects engagement of the clip 50 of the blanket 28 with the anchor 26. The buckle sensor 72 may include a switch, a contact sensor, a hall effect sensor, or any other suitable structure for detecting engagement of the blanket 28, e.g., the clip 50, with the anchor 26.

The computer 30 includes a processor and a memory. The memory includes one or more forms of computer readable media, and stores instructions executable by the computer 30 for performing various operations, including as disclosed herein. For example, the computer 30 can be a generic computer with a processor and memory as described above and/or may include an electronic control unit ECU or controller for a specific function or set of functions, and/or a dedicated electronic circuit including an ASIC (application specific integrated circuit) that is manufactured for a particular operation, e.g., an ASIC for processing sensor data and/or communicating the sensor data. In another example, the computer 30 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. In some examples, a combination of processor(s), ASIC(s), and/or FPGA circuits may be included in the computer 30. The memory can be of any type, e.g., hard disk drives, solid state drives, servers, or any volatile or non-volatile media. The memory can store the collected data sent from the sensors. The memory can be a separate device from the computer 30, and the computer 30 can retrieve information stored by the memory via a vehicle network 74, e.g., over a CAN bus, a wireless network, etc. Alternatively or additionally, the memory can be part of the computer 30, e.g., as a memory of the computer 30. The computer 30 may include or be communicatively coupled to, e.g., via the vehicle network 74 such as a communications bus as described further below, more than one processor, e.g., included in components such as sensors, electronic control units (ECUs) or the like included in the vehicle 22 for monitoring and/or controlling various vehicle components, e.g., a powertrain controller, a brake controller, a steering controller, etc. The computer 30 is generally arranged for communications on a vehicle network 74 that can include a bus in the vehicle 22 such as a controller area network CAN or the like, and/or other wired and/or wireless mechanisms. Alternatively or additionally, in cases where the computer 30 actually comprises a plurality of devices, the vehicle network 74 may be used for communications between devices represented as the computer 30 in this disclosure. Further, as mentioned below, various controllers and/or sensors may provide data to the computer 30 via the vehicle network 74.

The vehicle network 74 is a network via which messages can be exchanged between various devices in vehicle 22. The computer 30 is in electronic communication with, and can be generally programmed to send and/or receive, via vehicle network 74, messages and other information to and/or from other devices in vehicle 22 e.g., any or all of ECUs, sensors, actuators, components, communications module, a human machine interface HMI, the blower 68, the pressure sensor 70, the buckle sensor 72, the retractor 48, etc. In some implementations, vehicle network 74 can be a network in which messages are conveyed via a vehicle 22 communications bus. For example, vehicle network 74 can include a controller area network CAN in which messages are conveyed via a CAN bus, or a local interconnect network LIN in which messages are conveyed via a LIN bus. In some implementations, vehicle network 74 can include a network in which messages are conveyed using other wired communication technologies and/or wireless communication technologies e.g., Ethernet, WiFi, Bluetooth, etc. Additional examples of protocols that may be used for communications over vehicle network 74 in some implementations include, without limitation, Media Oriented System Transport MOST, Time-Triggered Protocol TTP, and FlexRay. In some implementations, the vehicle network 74 can represent a combination of multiple networks, possibly of different types, that support communications among devices in vehicle 22. For example, the vehicle network 74 can include a CAN in which some devices in the vehicle 22 communicate via a CAN bus, and a wired or wireless local area network in which some devices in the vehicle 22 communicate according to Ethernet or Wi-Fi communication protocols.

The computer 30 may be programmed to, i.e., the instructions stored in the memory may be executable by the processor to, inflate the blanket 28 to the inflated position. For example, the computer 30 may transmit a command to the blower 68 via the communication network indicating activation of the blower 68 to the on state. The command may indicate operation of the blower 68 in a first direction, e.g., rotation of the motor of the blower 68 in a direction providing air to the inflation chamber 60. The computer 30 may control inflation of the blanket 28 based on a pressure of the blanket 28. For example, the computer 30 may maintain the blower 68 in the on state until a pressure indicated by the pressure sensor 70 indicates above a threshold. In response to the pressure sensor 70 indicating above the threshold, the computer 30 may command the blower 68 to the off state until the pressure sensor 70 indicates pressure below the threshold. When the pressure sensor 70 indicates pressure below the threshold the computer 30 may command the blower 68 to return to the on state.

The computer 30 may be programmed to inflate the blanket 28 to the inflated position in response to detecting engagement of the blanket 28 with the anchor 26. For example, the computer 30 may determine the clip 50 is engaged with the anchor 26 based on information received from the buckle sensor 72 via the vehicle network 74. In response to receiving information indicating the clip 50 is engaged with the anchor 26, the computer 30 may command the blower 68 to the on state in the first direction, e.g., as described above.

The computer 30 may be programmed to deflate the blanket 28 to the uninflated position.

The computer 30 may command the blower 68 to an off state to deflate the blanket 28. For example, the computer 30 may transmit a command to the blower 68 via the communication network, the command indicating the off state. In the off state, the blower 68 no longer maintains air pressure in the inflation chamber 60, and air in the inflation chamber 60 may flow, e.g., out of inflation chamber 60 though small openings between fibers of the fabric, the stitching, etc. As another example, the command to the blower 68 may indicate operation of the blower 68, e.g., the motor of the blower, in a second direction opposite the first direction. Operation of the blower 68 in the second direction may remove air from the inflation chamber 60.

The computer 30 may be programmed to deflate the blanket 28 to the uninflated position in response to detecting disengagement of the blanket 28 from the anchor 26. For example, the computer 30 may determine the clip 50 is disengaged from the anchor 26 based on information received from the buckle sensor 72 via the vehicle network 74. In response to receiving information indicating the clip 50 is disengaged from the anchor 26, the computer 30 may command the blower 68 to the off state or to the on state in the second direction, e.g., as described above.

The computer 30 may be programmed to actuate the retractor 48 to move the blanket 28 to the retracted position. For example, the computer 30 may transmit a command to the retractor 48 via the vehicle network 74 and indicating actuation of the motor of the retractor. The computer 30 may actuate the retractor 48 to move the blanket 28 to the retracted position in response to detecting disengagement of the blanket 28 from the anchor 26. For example, the computer 30 may determine the clip 50 is disengaged from the anchor 26 based on information received from the buckle sensor 72 via the vehicle network 74. In response to receiving information indicating the clip 50 is disengaged from the anchor 26, the computer 30 may command the motor of the retractor 48, e.g., as described above.

Figure 6:
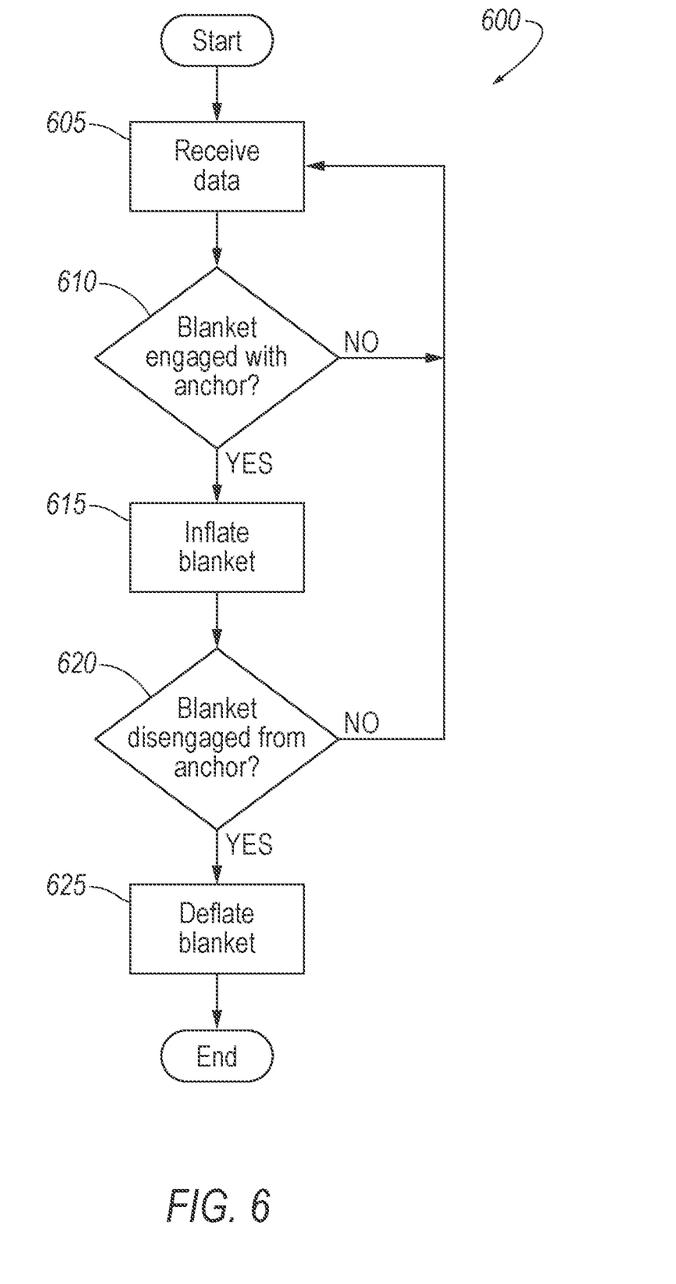
FIG. 6 is a flow chart showing a process for controlling inflation of the inflatable blanket.

FIG. 6 is a process flow diagram illustrating an exemplary process 600 for controlling inflation and deflation of the blanket 28. The process 600 begins in a block 605 in which the computer 30 receives data, e.g., from the pressure sensor 70, the buckle sensor 72, etc., e.g., via the vehicle network 74. The computer 30 may continue to receive data throughout the process 600. Throughout the process 600 in the present context means substantially continuously or at time intervals, e.g., every 200 milliseconds.

At a block 610 the computer 30 determines whether the blanket 28, e.g., the clip 50 of the blanket 28, is engaged with the anchor 26. For example, based on information from the buckle sensor 72 indicating detection of engagement of the clip 50 with the anchor 26 and received via the vehicle network 74. In response to detecting engagement of the blanket 28 with the anchor 26 the computer 30 moves to a block 615. In no engagement is detected, the computer 30 may return to the block 605.

At the block 615 the computer 30 inflates the blanket 28. For example, the computer 30 may command the blower 68 to operate in the first direction to inflate the blanket 28, e.g., by transmitting a command to the motor of the blower 68 via the vehicle network 74. The computer 30 may operate the blower 68 based on data from the pressure sensor 72, e.g., to maintain a certain pressure in the blanket 28.

At a block 620 the computer 30 determines whether the blanket 28, e.g., the clip 50 of the blanket 28, is disengaged from the anchor 26. For example, based on information from the buckle sensor 72 indicating detection of disengagement of the clip 50 from the anchor 26 and received via the vehicle network 74. In response to detecting disengagement of the blanket 28 from the anchor 26 the computer 30 moves to a block 625. If disengagement is detected, the computer 30 may return to the block 605 while maintaining the blanket 28 in inflated position, e.g., based on information from the pressure sensor 70.

At the block 625 the computer 30 deflates the blanket 28. For example, the computer 30 may command the blower 68 to operate in the second direction opposite the first direction. As another example, the computer 30 may command the blower 68 to the off state. Additionally at the block 625 the computer 30 may actuate the retractor 48 to move the blanket 28 to the retracted position in response to detecting disengagement of the blanket 28 from the anchor 26. For example, the computer 30 may transmit a command to the motor of the retractor 48. After the block 625, the process 600 may end. Alternately, the computer 30 may return to the block 605.

In the drawings, the same reference numbers indicate the same elements. With regard to the media, processes, systems, methods, etc. described herein, it should be understood that, although the steps of such processes, etc. have been described as occurring according to a certain ordered sequence, unless indicated otherwise or clear from context, such processes could be practiced with the described steps performed in an order other than the order described herein. Likewise, it further should be understood that certain steps could be performed simultaneously, that other steps could be added, or that certain steps described herein could be omitted.

Computer executable instructions may be compiled or interpreted from computer programs created using a variety of programming languages and/or technologies, including, without limitation, and either alone or in combination, Java, C, C, Visual Basic, Java Script, Perl, HTML, etc. In general, a processor e.g., a microprocessor receives instructions, e.g., from a memory, a computer readable medium, etc., and executes these instructions, thereby performing one or more processes, including one or more of the processes described herein. Such instructions and other data may be stored and transmitted using a variety of computer readable media. A file in a networked device is generally a collection of data stored on a computer readable medium, such as a storage medium, a random access memory, etc. A computer readable medium includes any medium that participates in providing data e.g., instructions, which may be read by a computer. Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

The adjectives first and second are used throughout this document as identifiers and, unless explicitly stated otherwise, are not intended to signify importance, order, or quantity. Use of "in response to," "based on," and "upon" herein indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. An assembly, comprising:
a seat;
an anchor fixed relative to the seat;
a blanket engageable with the anchor and inflatable to an inflated position; and
a computer having a processor and a memory storing instructions to inflate the blanket in response to detecting engagement of the blanket with the anchor and to deflate the blanket in response to detecting disengagement of the blanket from the anchor.

2. The assembly of claim 1, wherein the instructions include instructions to control inflation of the blanket based on a pressure of the blanket.

3. The assembly of claim 2, wherein the blanket defines an inflation chamber, and further comprising a pressure sensor in fluid communication with the inflation chamber and in electronic communication with the computer.

4. The assembly of claim 1, wherein the instructions include instructions to command a blower to operate in a first direction to inflate the blanket.

5. The assembly of claim 4, wherein the instructions include instructions to command the blower to operate in a second direction opposite the first direction to deflate the blanket.

6. The assembly of claim 4, wherein the instructions include instructions to command the blower to an off state to deflate the blanket.

7. The assembly of claim 1, wherein the blanket is movable from a retracted position under the seat to a deployed position extending over the seat.

8. The assembly of claim 7, wherein the blanket in the retracted position is elongated along a seat-lateral axis.

9. The assembly of claim 7, wherein the seat includes a seatback and a seat bottom extending from a proximate end at the seatback to a distal end spaced from the seatback, the blanket in the retracted position at the distal end.

10. The assembly of claim 9, wherein the anchor is at the proximate end.

11. The assembly of claim 10, wherein the anchor is configured to comply with ISOFIX.

12. The assembly of claim 7, further comprising a spool and a retractor operatively coupled to the spool, the blanket in the retracted position wound around the spool.

13. The assembly of claim 12, wherein the instructions include instructions to actuate the retractor to move the blanket to the retracted position in response to detecting disengagement of the blanket from the anchor.

14. The assembly of claim 1, wherein the blanket in the inflated position includes a first bolster, a second bolster spaced from the first bolster, and a center portion extending from the first bolster to the second bolster.

15. The assembly of claim 14, wherein the first bolster and the second bolster are elongated along a seat-lateral axis.

16. The assembly of claim 14, wherein the first bolster and the second bolster are elongated along an axis, and the first bolster and the second bolster extend beyond the center portion along the axis in a first direction.

17. The assembly of claim 16, wherein the first bolster and the second bolster extend beyond the center portion along the axis in a second direction opposite the first direction.

18. The assembly of claim 14, wherein the first bolster is spaced from the second bolster along a seat-longitudinal axis.

19. The assembly of claim 1, wherein the blanket defines an access port at the anchor.

20. The assembly of claim 19, wherein the access port is defined by a recessed portion inward of an outer edge of the blanket.

\* \* \* \* \*

UNITED STATES PATENT AND TRADEMARK OFFICE
CERTIFICATE OF CORRECTION

PATENT NO. : 11,643,043 B1
APPLICATION NO. : 17/674878
DATED : May 9, 2023
INVENTOR(S) : Zhibing Deng et al.

It is certified that error appears in the above-identified patent and that said Letters Patent is hereby corrected as shown below:

In the Specification

Column 3, Line 41:    Delete "58a, 58b and 58c"

Signed and Sealed this
Eleventh Day of July, 2023

Katherine Kelly Vidal
*Director of the United States Patent and Trademark Office*